O. ERF.
COW STALL.
APPLICATION FILED SEPT. 2, 1910.
1,054,287.
Patented Feb. 25, 1913.
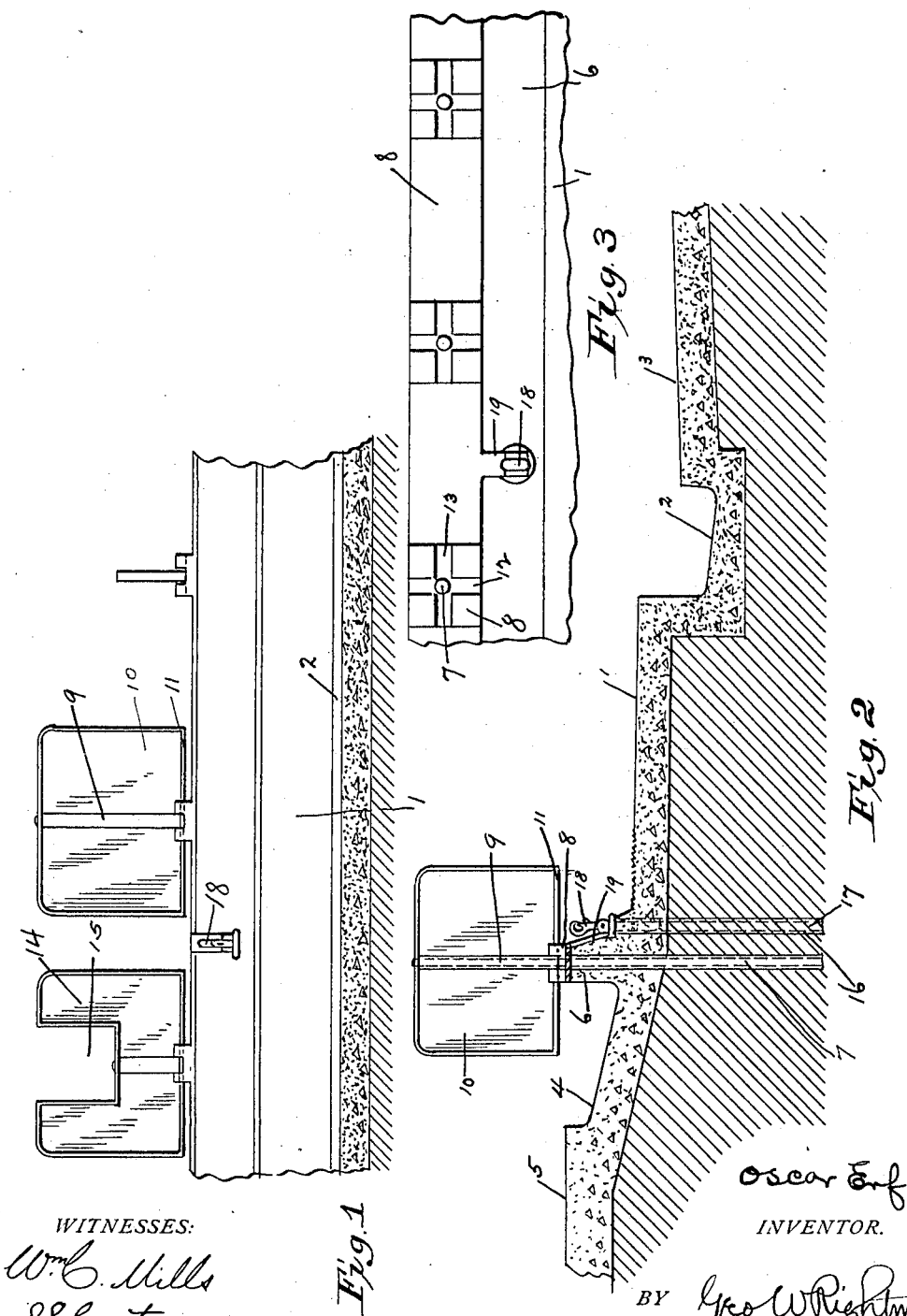

UNITED STATES PATENT OFFICE.

OSCAR ERF, OF COLUMBUS, OHIO.

COW-STALL.

1,054,287.    Specification of Letters Patent.    Patented Feb. 25, 1913.

Application filed September 2, 1910. Serial No. 580,247.

*To all whom it may concern:*

Be it known that I, OSCAR ERF, a citizen of the United States, residing at Columbus, in the county of Franklin and State of Ohio, have invented certain new and useful Improvements in Cow-Stalls, of which the following is a specification.

My invention relates to cow stalls and the means of securing a cow in position therein. The invention embodies improvements in the tie for the cow, and the arrangement of the guard between adjacent cows, and in providing an adjustable guard which may be moved out of position when the cows are taken out of the stalls and thereby all the stalls are thrown into a continuous stall, which is readily cleansed and aired. When the cows are returned to the stalls, the guards are repositioned to form a barrier between stalls with respect to the cows themselves and also to the quantity of food allotted to each in the trough, which is preferably made common.

Correct sanitation and ease of construction and handling of all parts are provided by my improvements illustrated in the drawings hereto attached and hereby made a part of this specification, in which—

Figure 1 is a view from the rear to the front of the stall, showing the securing or tying device, and the guards in their unused position; Fig. 2 is a section through the length of a stall, showing the contour of the surface upon which a cow stands and a guard in used position; Fig. 3 is a top plan view of the plate overlying the ridge separating the stall proper and trough, on which plate the guard members are mounted and secured in any desired position.

Referring to the drawings, 1 is the concrete surface of the stall, having at the rear the continuous gutter, 2 for offal, and the gangway 3 still farther back; 4 is a feed trough preferably continuous, 5 is a gangway along the same, and 6 is a ridge formed in the concrete, separating the trough from the stall proper. In the ridge is placed a post 7 projecting at the top through the plate 8 and adapted to enter the tube 9 carrying the guard 10, which may be raised and lowered slidably thereon, and rotated. In the position of the guard 10 in Fig. 2 the lower edge 11 rests in the transverse groove 12 formed in the plate member 8; when the guard 10 is in the position shown in Fig. 1, the lower edge rests in the longitudinal groove 13, and is held therein against rotation until the guard is again lifted on the post 7. The guard 14 is similarly mounted and manipulated and is cut out at 15 to receive a water or food receptacle. A cow stands between the two guards which are placed in parallel with the length of the cow when she is in position, as shown in Fig. 2 and are transverse to the stall when the cow is out as shown in Fig. 1.

To secure the cow in place I provide the hitching device comprising the tube 16 into which is inserted the slidable rod 17, carrying at its upper end the snap 18; the cow wears a strap about her neck having preferably a ring therein, and the snap 18 is engaged with the ring. As the cow moves her head upwardly, the rod 17 also moves upwardly, and drops back in the tube 16 when the cow lowers her head. This does not confine the head to one position, and affords comfort both while standing and lying down. It also holds the cow in position to cause all droppings and excrement to fall into the gutter 2, whence it is readily removed, and the cow is not contaminated thereby, and in consequence a high degree of sanitation is attained. The cow, when thus tied, can readily reach over the ridge 6 into the trough 4, but is prevented from reaching too far along the trough in both directions by the guards 10, 14, which also present a barrier between adjacent cows, making it impossible for them to bring their heads into contact with each other. When the cows are admitted, the one going to the end stall first passes in, is tied to the snap 18, and the guard on the hither side is swung into the position shown in Fig. 2 from the position illustrated in Fig. 1; the succeeding cow is treated likewise, and so on to the last, when it is seen that all cows are securely tied, are guarded from each other, and each is prevented from reaching more food in the common trough than properly is allotted to her. When the cows are out, the guards are all in the position shown in Fig. 1 and a continuous stall is formed, from which all refuse matter may be easily cleared, and into which new bedding material may readily be placed, and the arrangement is such that all labor therein may be done with the least possible hindrance by the stall construction.

In the drawings I have illustrated a tongue 19 extending from the plate member 8, and through this tongue extends the rod 17 carrying the snap 18, providing a firm bearing for the rod 17 as it slides in and out of the tube 16, in accordance with the movements of the neck and head of the cow.

My improvements are simple, provide a stall of correct and complete sanitation and are easily provided and replaced as occasion demands, and are withal quickly and easily manipulated.

What I claim as new and desire to secure by Letters Patent is:

A cow stall having a concrete floor provided with a gutter on its rear portion, and a ridge on its front portion forming a front side wall of the trough, hitching device automatically adaptable to the various permitted positions of the cow, removable head guard members stationed on said ridge constructed to be slid vertically and to be rotated thereon to stand transversely on said ridge or parallel therewith, appropriate grooves or channels being provided in said ridge to maintain said guard members in either of said positions.

In testimony whereof I affix my signature in the presence of two witnesses.

OSCAR ERF.

Witnesses:
 H. C. MOORE,
 E. F. RINEHART.

Copies of this patent may be obtained for five cents each, by addressing the "Commissioner of Patents, Washington, D. C."